United States Patent [19]

Liu

[11] Patent Number: 5,951,630
[45] Date of Patent: Sep. 14, 1999

[54] DIGITAL ADDER CIRCUIT

[75] Inventor: Jianwei Liu, Manchester, United Kingdom

[73] Assignee: ARM Limited, Cambridge, United Kingdom

[21] Appl. No.: 08/783,287

[22] Filed: Jan. 10, 1997

[30]    Foreign Application Priority Data

Oct. 2, 1996 [GB] United Kingdom ............... 9620526

[51] Int. Cl.$^6$ ........................................... G06F 7/50
[52] U.S. Cl. .......................................... 708/700
[58] Field of Search ................. 364/786, 716; 395/800; 708/700, 706; 712/1

[56]          References Cited

U.S. PATENT DOCUMENTS

| | | | |
|---|---|---|---|
| 4,099,248 | 7/1978 | Borgerson et al. | 364/787 |
| 5,134,579 | 7/1992 | Oki et al. | 364/786 |
| 5,278,783 | 1/1994 | Edmondson | 364/787 |
| 5,329,477 | 7/1994 | Kudou | 364/786 |
| 5,465,224 | 11/1995 | Guttage et al. | 364/716 |
| 5,485,411 | 1/1996 | Guttag et al. | 364/716 |
| 5,493,524 | 2/1996 | Guttag et al. | 364/786 |
| 5,499,203 | 3/1996 | Grundland | 364/786 |
| 5,596,763 | 1/1997 | Guttag et al. | 395/800 |

FOREIGN PATENT DOCUMENTS 0 626 638 A1   3/1994   European Pat. Off. .......... G06F 7/50

OTHER PUBLICATIONS

Doran, R. W., "Variants of an Improved Carry Look–Ahead Adder", IEEE Transaction on Computers, vol. 37, No. 9, Sep., 1988, pp. 1110–1113.

Dobberpuhl, Daniel W. et al., "A 200–MHz 64–b Dual–Issue CMOS Microprocessor", IEEE Journal of Solid–State Circuits, vol. 27, No. 11, Nov., 1992, pp. 1555–1564.

Brent, Richard P. et al., "A Regular Layout for Parallel Adders", IEEE Transactions on Computers, vol. C–31, No. 3, Mar., 1982, pp. 260–264.

*Primary Examiner*—Dennis M. Butler
*Assistant Examiner*—Omar A. Omar
*Attorney, Agent, or Firm*—Nixon & Vanderhye P.C.

[57]            ABSTRACT

A binary adder circuit includes carry evaluation circuits that encode a carry production control signal using two signal values (V, W) such that V=W=0 indicates a carry kill, V=W=1 indicates a carry generate and V≠W indicates a carry propagate. The carry evaluation circuit may be implemented in static or dynamic CMOS logic.

17 Claims, 14 Drawing Sheets

DIGITAL ADDER CIRCUIT

BACKGROUND OF THE INVENTION

1. Field of the Invention

This invention relates to the field of data processing. More particularly, this invention relates to digital adder circuits used within data processing systems.

2. Description of the Prior Art

Addition is one of the most important arithmetic operations that is frequently performed within data processing systems. A problem with producing high speed adder circuits is that the high order bits of the result are dependent upon the carry out values from the low order bits. The consequence of this is that addition operations tend to be relatively slow. It is a constant aim within data processing systems that they should operate as rapidly as possible and to this end considerable effort has been expended over many years in designing and developing adder circuits that are capable of operating at high speed.

In an effort to operate at higher speeds techniques have been proposed in which the carry bits for a sum of two input operands are calculated separately to an exclusive OR operation performed upon the two input operands with the results being combined at the final stage to produce the sum.

An example of such a technique is the Brent and Kung adder described in the paper "A regular layout for parallel adders", R P Brent and H T Kung, IEEE Trans. Comput, Volume 31, pages 260 to 264, March 1982.

Whilst such carry bit calculation schemes improve performance, the carry computation requires several layers of logic to perform. This logic consumes circuit area and power as well as limiting the ultimate performance that can be achieved.

It is an object of the invention to address the above mentioned problems.

SUMMARY OF THE INVENTION

Viewed from one aspect the present invention provides an adder circuit for adding a first binary number and a second binary number, said adder circuit comprising:

a carry evaluating circuit for evaluating a carry production control signal representing a sum of a block of corresponding bits of said first binary number and said second binary number and an input carry value to said block, said carry production control signal comprising two signals V and W that can each have a value of either P or Q, said carry production control signal encoding a carry result from said sum in accordance with:

V=W=P represents a carry kill whereby said carry result is zero independent of said input carry value;

V≠W represents a carry propagate whereby said carry result equals said input carry value; and V=W=Q represents a carry generate whereby said carry result is one independent of said input carry value.

The invention provides an encoding for the carry production control signal that is capable of being produced with fewer circuit elements and with fewer logical layers resulting in a faster, smaller and more power efficient circuit. It will be appreciated that the values P and Q that the two signals V and W can take could have a variety of absolute values and could be in true or inverted form. However, in advantageously simple preferred embodiments the values P and Q take on the voltage rail binary values of the system wherein P=0 and Q=1.

The carry evaluating circuit that performs the encoding set out above would typically occur many times within an adder circuit as a whole. Depending upon where in the adder circuit a particular carry evaluating circuit is positioned it will receive as its input either bits from the first binary number and the second binary number or bits comprising previously evaluated carry production control signals from upstream in the circuit. More particularly, in preferred embodiments of the invention said carry evaluating circuit is responsive to two pairs of input signals $(a_1, b_1)$ and $(a_2, b_2)$ that comprise one of two respective pairs of bits of said first binary number and said second binary number or two previously evaluated carry production control signals and V and W are given by:

$$V=a_2.b_2+(a_2+b_2).a_1;$$

and $$W=a_2.b_2+(a_2+b_2).b_1.$$

There is a balance to be struck between the number of pairs of input signals that a carry evaluating circuit can resolve in one operation and the size, complexity and practicality of the necessary circuit to achieve that evaluation. More particularly, if a carry evaluating circuit is able to resolve more pairs of input signals, then fewer layers of carry evaluating circuits will be needed in the overall adder circuit. However, as the number of pairs of input signals to a carry evaluating circuit rises, the complexity of the determination being performed by that carry evaluating circuit increases as does the size of the circuit and its ability to operate within the finite voltage and series loss constraints of an integrated circuit.

For the above reasons, it has been found that carry evaluating circuits that are responsive to one of two, three or four pairs of input signals are most preferred. However, it will be appreciated that in general terms the carry evaluating circuit could be responsive to N pairs of input signals (where N is an integer greater than 1).

Whilst the carry evaluating circuit described above could be used in a variety of contexts, it is particularly suited for systems in which a plurality of said carry evaluating circuits are used in a parallel prefix structure to evaluate a full set of carry bits from said first binary number and said second binary number.

The encoding performed by the carry evaluating circuit is one that is well suited to efficient implementation in a plurality of static CMOS logic gates.

Alternatively, if a dynamic integrated circuit is preferred in order to reduce circuit area, then the encoding is also suitable for embodiment by a plurality of dynamic CMOS logic gates.

A preferred adder circuit structure within which the above described techniques may be employed is one comprising:

a carry binary number determining circuit responsive to said first binary number and said second binary number for determining a carry binary number composed of carry bits of a sum of said first binary number and said second binary number, said carry binary number determining circuit having a plurality of circuit stages operating in series to determine said carry binary number, each circuit stage serving to partially resolve said carry binary number and at least one circuit stage including at least one of said carry bit evaluating circuits generating a carry control production signal that is passed between said circuit stages as an input signal to a next circuit stage; and a combinatorial logic circuit responsive to respective corresponding bits of said first binary number, said second binary number and said carry binary number to generate a corresponding bit of a result binary number.

In the above described circuit, an advantageously rapid determination of the carry binary number may be made. Once this carry binary number has been determined then the final summand may be determined in embodiments in which for corresponding bits A, B and C of said first binary number, said second binary number and said carry binary number respectively, said combinatorial logic circuit performs the operation ((A XOR B) XOR C).

A further refinement that helps reduce the total circuit area required is one in which for carry evaluating circuits for which said carry control production signal must represent either a carry kill or a carry generate, V=W and a single signal line may be used to transmit said carry control production signal.

The adder circuit of the present invention is particularly well suited for use within an integrated circuit microprocessor.

Viewed from another aspect the present invention provides a method of operating an adder circuit for adding a first binary number and a second binary number, said method comprising the steps of:

evaluating a carry production control signal representing a sum of a block of corresponding bits of said first binary number and said second binary number and an input carry value to said block, said carry production control signal comprising two signals V and W that can each have a value of either P or Q, said carry production control signal encoding a carry result from said sum in accordance with:

V=W=P represents a carry kill whereby said carry result is zero independent of said input carry value;

V≠W represents a carry propagate whereby said carry result equals said input carry value; and V=W=Q represents a carry generate whereby said carry result is one independent of said input carry value.

The above, and other objects, features and advantages of this invention will be apparent from the following detailed description of illustrative embodiments which is to be read in connection with the accompanying drawings.

DESCRIPTION OF THE PREFERRED EMBODIMENTS

The general concept of carry arbitration will be considered first. In the general case the carry $c_{i+1}$ is evaluated by adding two 1-bit binary numbers $a_i$ and $b_i$. There are two general cases defined by the values of $a_i$ and $b_i$. The first case, where there is an output carry request, arises when both operand bits are equal. A 1-carry request occurs if both inputs are 1, whereas a 0-carry request if both inputs are 0. The second case, where there is no output carry request, arises when the operand bits have different values. See Table 1 in which the letter u indicates there is no output carry request.

TABLE 1

| $a_i, b_i$ | $c_{i+1}$ |
|---|---|
| 0 0 | 0 |
| 1 1 | 1 |
| 0 1 | u |
| 1 0 | u |

Figure 1:
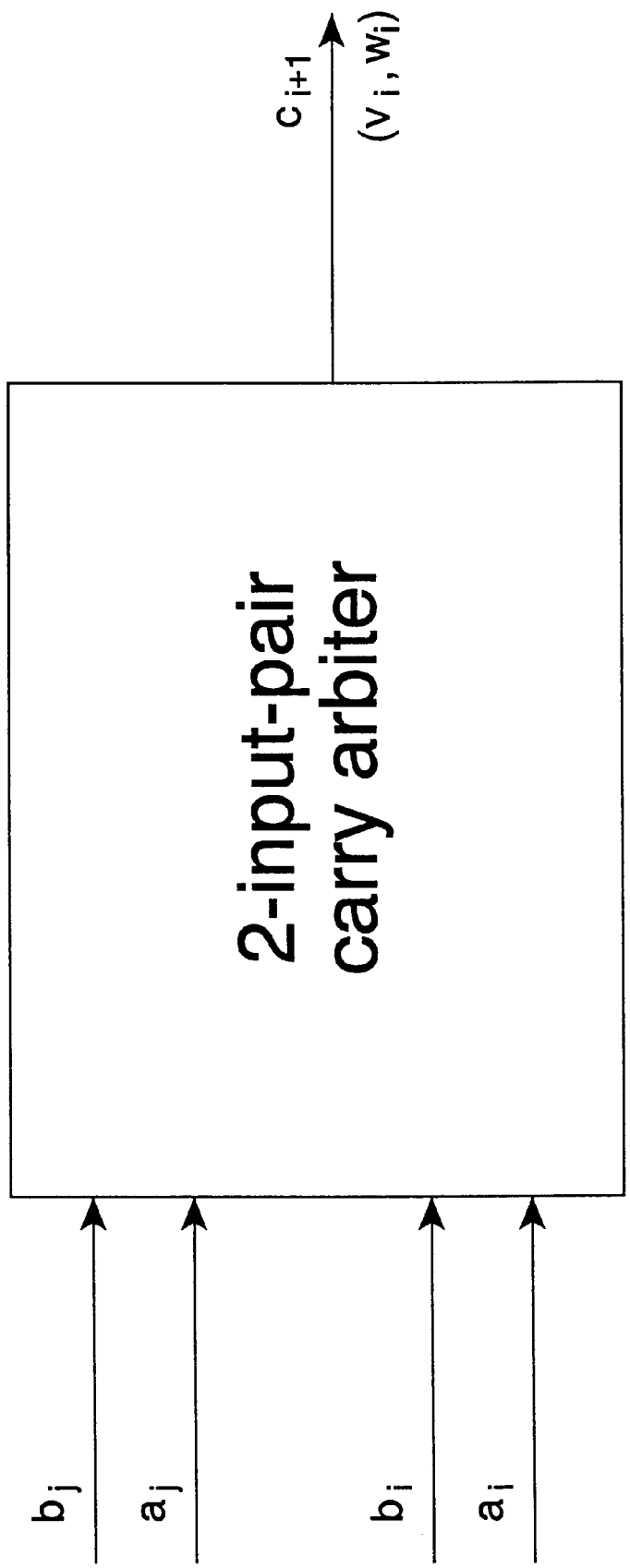
FIG. 1 illustrates a two-input-pair carry evaluation circuit.

One input pair $(a_i, b_i)$ may or may not make a carry request. If two input pairs $(a_i, b_i)$ and $(a_j, b_j)$ are used, two carry requests may occur at the same time. Therefore, it is necessary to arbitrate these two carry requests. It is of note that i and j relate to two adjacent bits (at the first level) or blocks of bits (at subsequent levels) in the calculation, thus if we arbitrating between carry requests relating to previously arbitrated blocks of 3 bits, then i=j+3. FIG. 1 shows a 2-input-pair carry arbiter (carry evaluation circuit). The input pair $(a_i, b_i)$ can make a non-maskable carry request (non-maskable has the meaning that this request must always be acknowledged by the output carry $c_{i+1}$). The input pair $(a_j, b_j)$ can make a maskable carry request (maskable has the meaning that this request may be masked by a non-maskable carry request). Only when there is no non-maskable carry request from the input pair $(a_i, b_i)$, is a maskable carry request from the input pair $(a_j, b_j)$ acknowledged by the output carry $c_i+1$. This is illustrated in Table 2.

TABLE 2

| $a_i, b_i$ | $a_j, b_j$ | $C_{i+1}$ |
|---|---|---|
| 0 0 | — — | 0 |
| 1 1 | — — | 1 |
| 0 1 (or 1 0) | 0 0 | 0 |
| 0 1 (or 1 0) | 1 1 | 1 |
| 0 1 (or 1 0) | 0 1 (or 1 0) | u |

The output carry $c_{i+1}$ can be encoded using two wires ($v_i$, $w_i$) as shown in Table 3. The signals on the two wires constitute the carry production control signal. The following equations satisfy Tables 2 and 3:

TABLE 3

$$v_i = a_ib_i + (a_i + b_i)\,a_j$$
$$w_i = a_ib_i + (a_i + b_i)\,b_j \quad (1)$$

| $c_{i+1}$ | $v_i, w_i$ |
|---|---|
| 0 | 0 0 |
| 1 | 1 1 |
| u | 0 1 |
| u | 1 0 |

Figure 2:
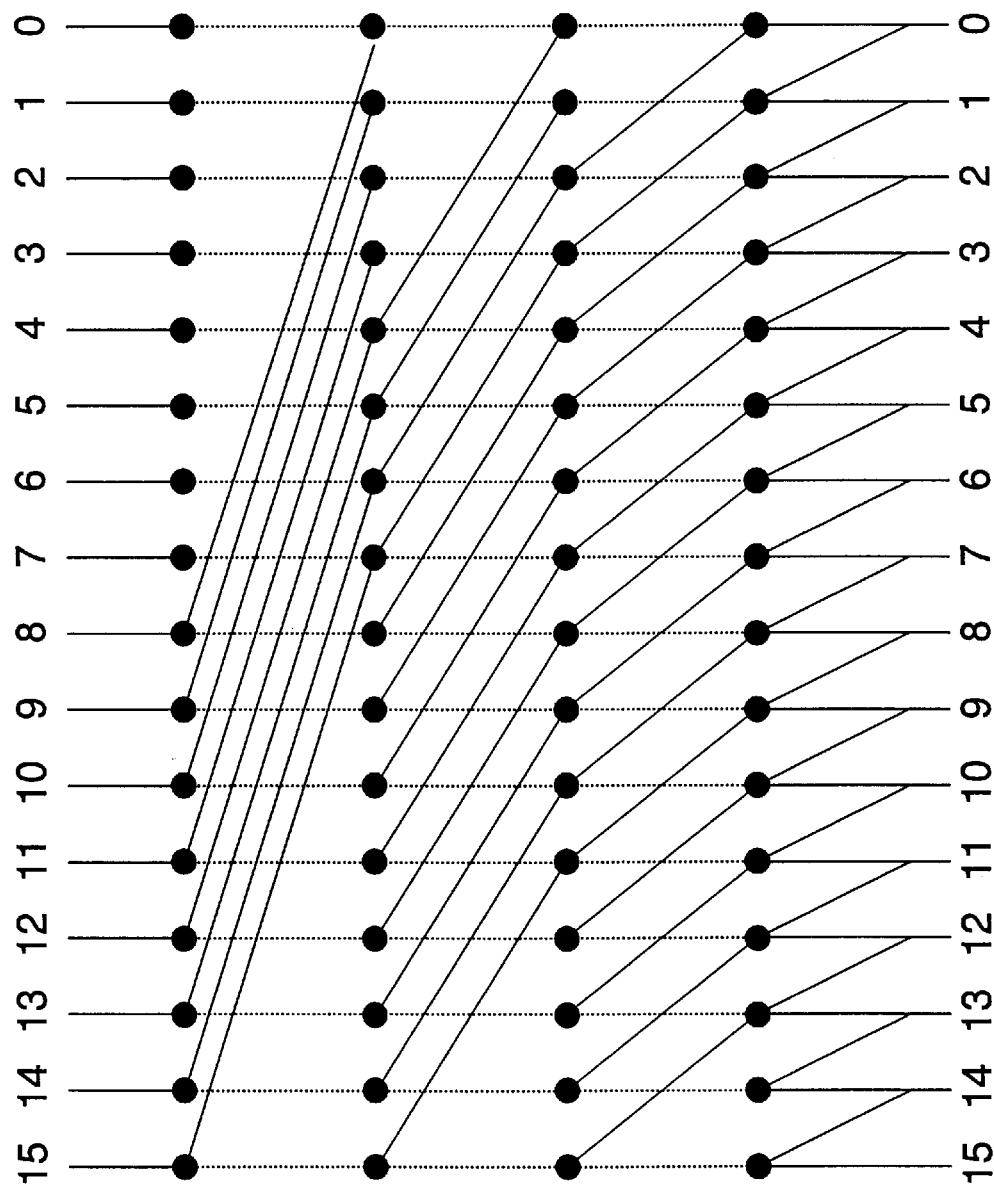
FIG. 2 illustrates a 16 bit carry binary number evaluating system incorporating the carry evaluation circuits of FIG. 1.

A 16-bit fast carry computation using 2-input-pair carry arbiters is shown in FIG. 2, which illustrates that the scheme is regular. Each node in FIG. 2 is a 2-input-bit carry arbiter. Depending on its inputs, each node can be considered to "vote" on the result to be passed up to the next level in the circuit. The node can indicate a carry generate (1, 1) (a vote yes), a carry kill (0, 0) (a vote no) or a carry propagate (0, 1) or (1, 0) (an abstention). At the bottom level, this arbitration is carried out between bits of the input operands, and at higher level between the results of previously determined arbitrations.

The system of FIG. 2 is different from the scheme proposed by Brent and Kung as mentioned earlier. The computation logic needed for $g_i$ (the generate signal) and $p_i$ (the propagate signal) in the Brent and Kung adders is not necessary in the present scheme. This results in fewer layers of logic being required and hence high-speed carry generation.

In the Brent and Kung scheme the two pairs $(g_i, p_i)$ and $(g_j, p_j)$ generated from the input pairs $(a_i, b_i)$ and $(a_j, b_j)$ can be viewed as new input pairs. The new input pair $(g_i, p_i)$ makes a 0-carry request when $g_i$ and $p_i$ are both 0, a 1-carry request when $g_i$ is 1, and no carry request when $p_i$ is 1. Note that $g_i$ and $p_i$ are mutually exclusive as shown in Table 4.

TABLE 4

| $g_i, p_i$ | $g_j, p_j$ | $c_{i+1}$ |
|---|---|---|
| 0 0 | — — | 0 |
| 1 0 | — — | 1 |
| 0 1 | 0 0 | 0 |
| 0 1 | 1 0 | 1 |
| 0 1 | 0 1 | u |

The output carry $c_{i+1}$ could be encoded using two wires $(v_i, w_i)$ as shown in Table 5. The following equations satisfy Tables 4 and 5:

TABLE 5

$$v_i = g_i + p_ig_j$$
$$w_i = p_ip_j \quad (2)$$

| $c_{i+1}$ | $v_i, w_i$ |
|---|---|
| 0 | 0 0 |
| 1 | 1 0 |
| u | 0 1 |

Equation (2) above is the key idea of the well known Brent and Kung adders. The logic computation for the carry generate $g_i$ and the carry propagate $p_i$ is wasteful except for understanding how the carries are generated and propagated.

Figure 3:
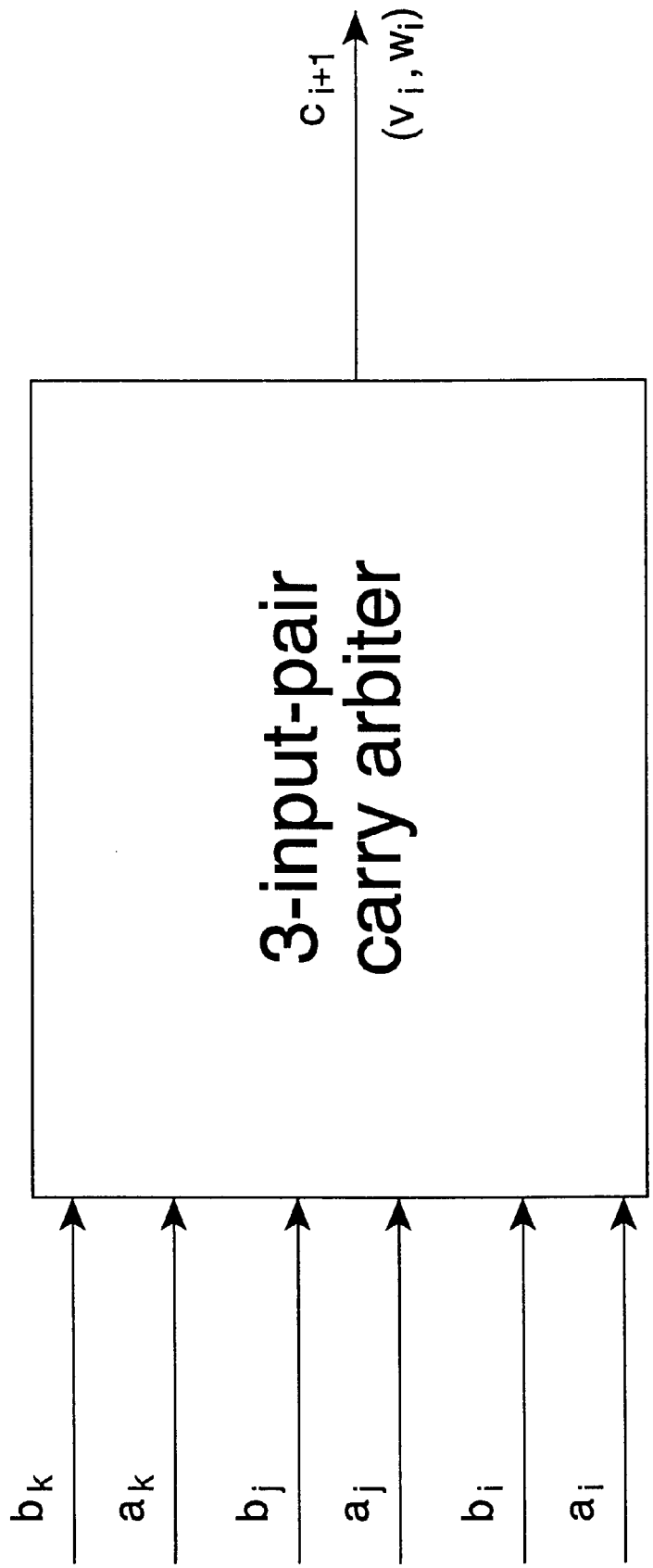
FIG. 3 illustrates a three-input-pair carry evaluation circuit.

A 3-input-pair carry arbiter in accordance with the present scheme is shown in FIG. 3. The input pair $(a_i, b_i)$, can make a non-maskable carry request. The input pairs $(a_j, b_j)$ and $(a_k, b_k)$ can both make a maskable carry request at the same time. However, the input pair $(a_j, b_j)$ has priority over the input pair $(a_k, b_k)$. Only when there is no non-maskable carry request from the input pair $(a_i, b_i)$ and no maskable carry from the input pair $(a_j, b_j)$, is a maskable carry request from the input pair $(a_k, b_k)$ acknowledged by the output carry $c_{i+1}$ as illustrated in Table 6. The following equations satisfy Tables 3 and 6:

TABLE 6

$$v_i = a_ib_i + (a_i + b_i)(a_jb_j + (a_j + b_j)a_k)$$
$$v_i = a_ib_i + (a_i + b_i)(a_jb_j + (a_j + b_j)b_k) \quad (3)$$

| $a_i, b_i$ | $a_j, b_j$ | $a_k, b_k$ | $c_{i+1}$ |
|---|---|---|---|
| 0 0 | — — | — — | 0 |
| 1 1 | — — | — — | 1 |
| 0 1 (or 1 0) | 0 0 | — — | 0 |
| 0 1 (or 1 0) | 1 1 | — — | 1 |
| 0 1 (or 1 0) | 0 1 (or 1 0) | 0 0 | 0 |
| 0 1 (or 1 0) | 0 1 (or 1 0) | 1 1 | 1 |
| 0 1 (or 1 0) | 0 1 (or 1 0) | 0 1 (or 1 0) | u |

Figure 4:
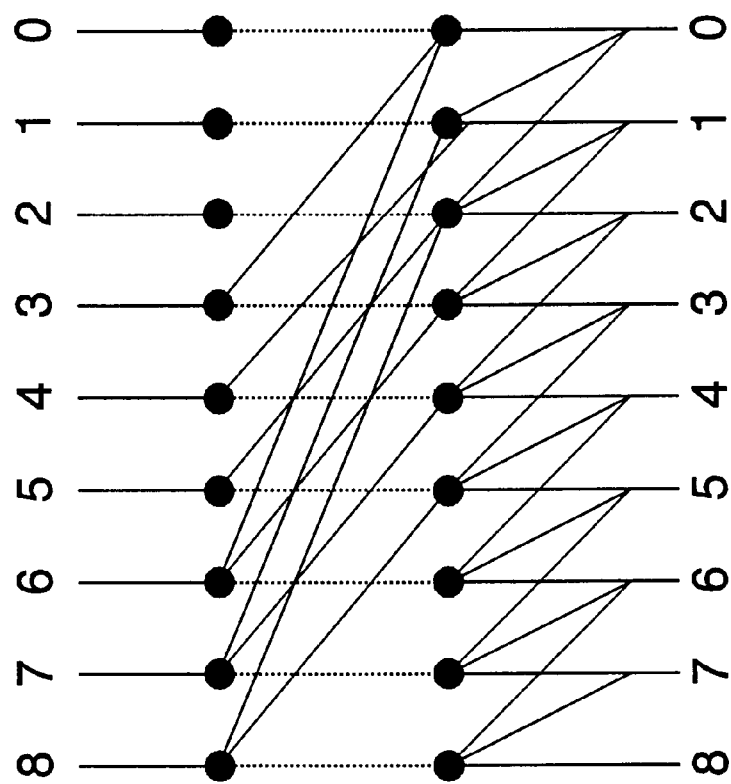
FIG. 4 illustrates a 9 bit carry binary number evaluation system incorporating the carry evaluation circuits of FIG. 3.

FIG. 4 shows a 9-bit carry computation using 3-input-pair carry arbiters, which results in only two layers of logic and hence high-speed carry generation. The addition of n-bit binary numbers using 3-input-pair carry arbiters can be performed in time proportional to $O(\log_3 n)$, and therefore is more efficient than using 2-input-pair carry arbiters where the computation time is $O(\log_2 n)$.

Using a similar approach to 2- or 3-input-pair carry arbiters, carry arbiters with any numbers of input pairs can be derived. However, carry arbiters with more than 4 input pairs are not usually of interest. Firstly, too many series transistors are needed to implement these arbiters, which leads to inefficient CMOS designs. Secondly, the arbiter cell layout becomes too large for the bit slice of a datapath.

Figure 5:
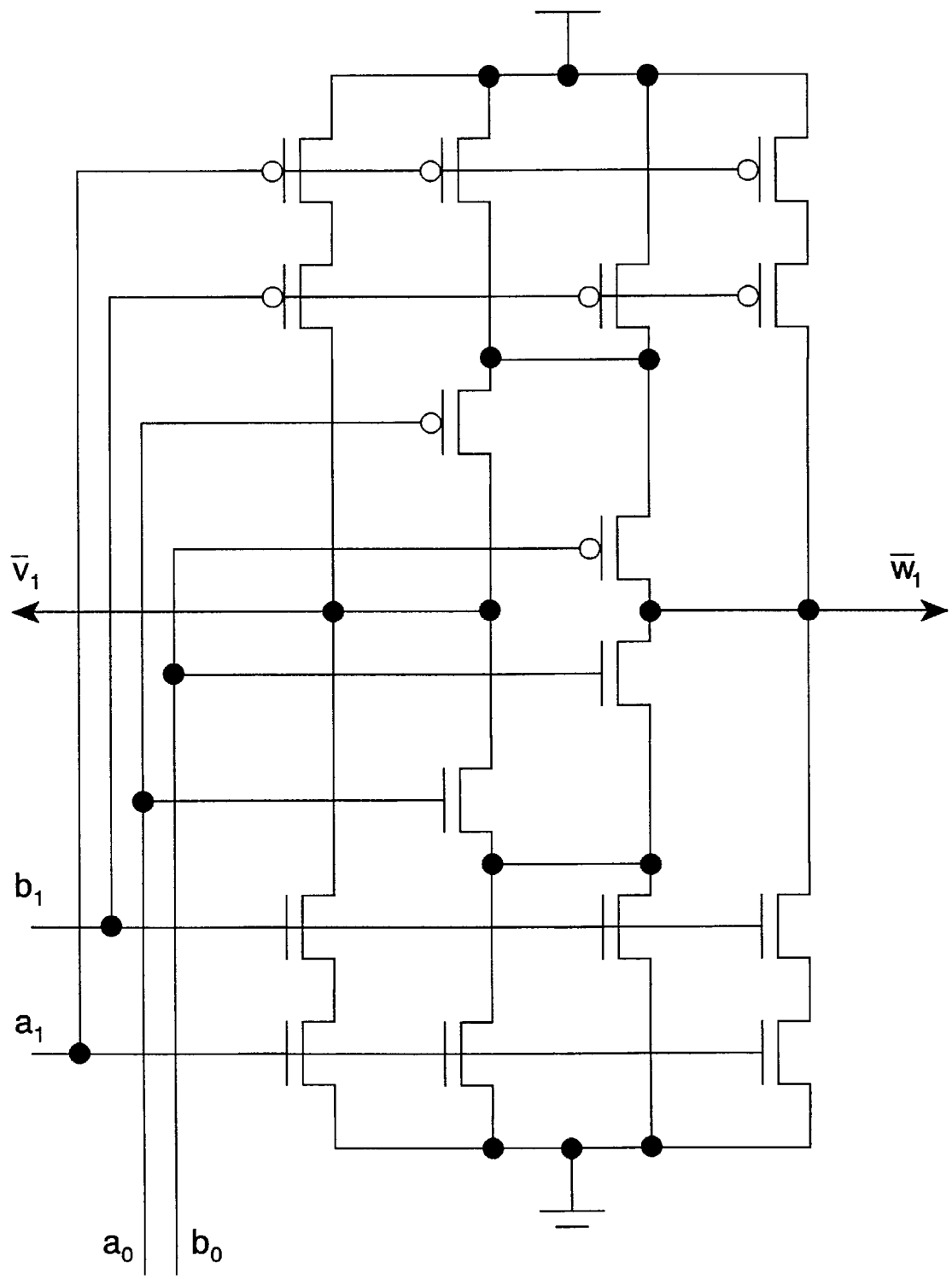
FIG. 5 illustrates a static CMOS embodiment of the circuit of FIG. 1.

FIG. 5 shows a static CMOS implementation of the 2-input-pair carry arbiter. Note that the outputs $v_i$ and $w_i$ are complemented signals. However, the arbiter is quite symmetrical and implementing the next stage in inverse logic is straight forward. The signals through two arbiters are naturally positive-true, so no inverters are needed.

Figure 6:
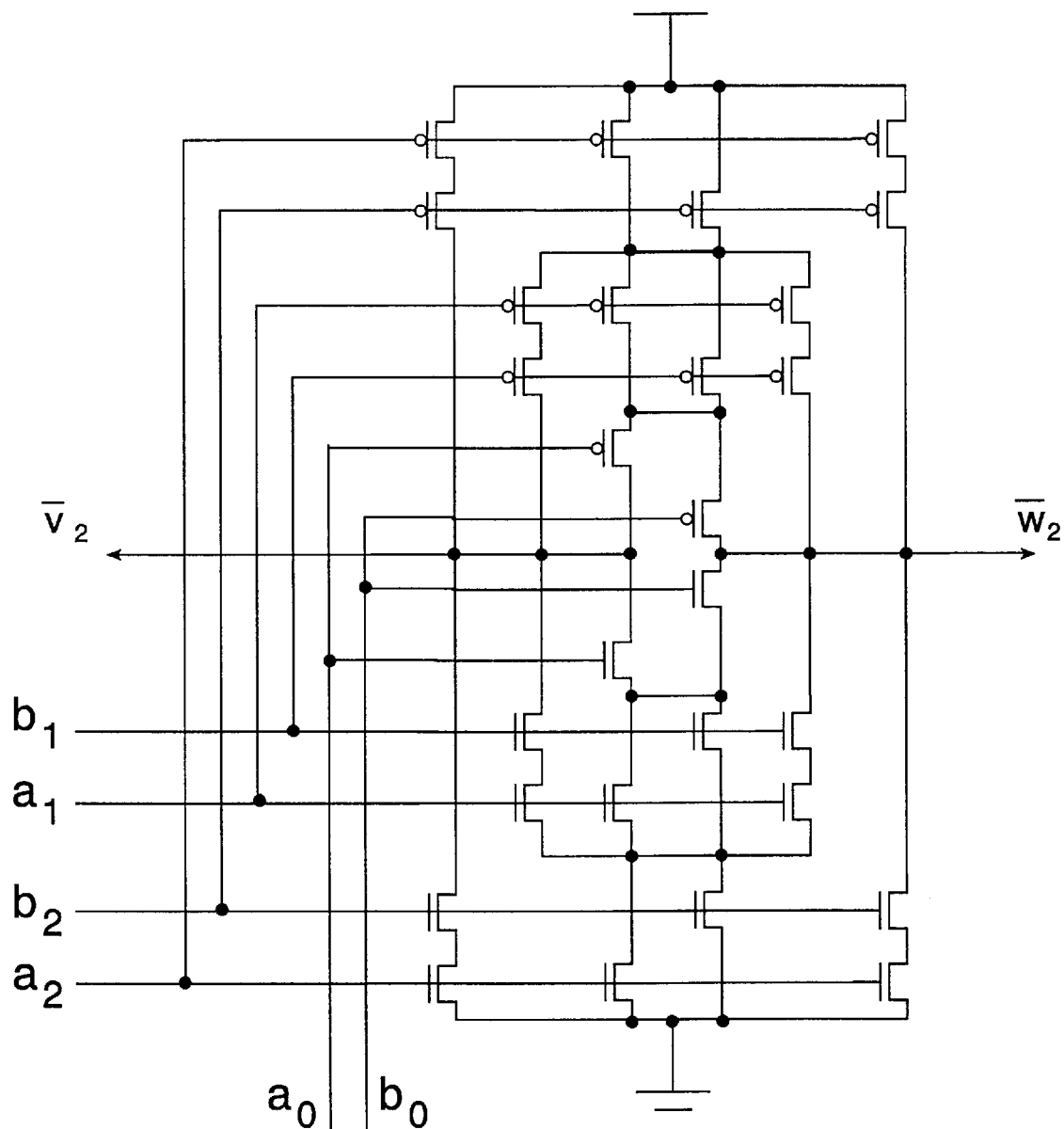
FIG. 6 illustrates a static CMOS embodiment of the circuit of FIG. 3.

FIG. 6 shows a static CMOS implementation of the 3-input-pair carry arbiter. 3- or 4-input-pair carry arbiters may be advantageous if dynamic CMOS techniques are used, in which case either the pull-up or pull-down parts of the circuits of FIG. 3 may be used. Extending the 3-input-pair circuit of FIG. 6 to produce a 4-input-pair or higher circuit is achieved by symmetrically extending in stages in an analogous manner to the extension between FIGS. 5 and 6.

The verification of design may be carried out formally by considering an n-bit adder based on 2-input-pair arbiters as an example, Let $a_n, a_{n-1}, \ldots, a_1$ and $b_n, b_{n-1}, \ldots, b_1$ be n-bit binary numbers without carries $c_n, c_{n-n}, \ldots, c_1$, and let $c_0$ be the input carry bit. We defined an operator o [1] as follows:

$$(a, b)o(a', b') = (ab + (a + b)a', ab + (a + b)b') \quad (4)$$

Theorem 11 (Theorem): Let $(v_i, w_i) = (c_1, c_1)$      if $i = 1$, and $(v_i, w_i) = (a_i, b_i)o(v_{i-1}, w_{i-1})$      if $2 \le i \le n$, where $c_1 = a_1b_1 + (a_1 + b_1)c_0$.

Then $c_i = v_i = w_i$      for $1, 2, \ldots, n$      (5)

Proof: We prove the theorem by induction on i. It may be seen that the equation (5) holds for i=1. If i>1 and $c_{i-1}=v_{i-1}=w_{i-1}$, then $$(v_i, w_i) = (a_i, b_i)o(v_{i-1}, w_{i-1})$$
$$= (a_i, b_i)o(c_{i-1}, c_{i-1})$$
$$= (a_ib_i + (a_i + b_i)c_{i-1}, a_ib_i + (a_i + b_i)c_{i-1})$$
$$= (c_i, c_i)$$

Thus, the equation (5) holds by induction.

The operator o can be proved to be associative. Therefore, $v_i$ and $w_i$ can be computed in any order from the given input values. This provides the foundation for using tree structures to generate carries. Note that the operator o is not commutative, which implies the priorities of different input pairs.

Figure 7:
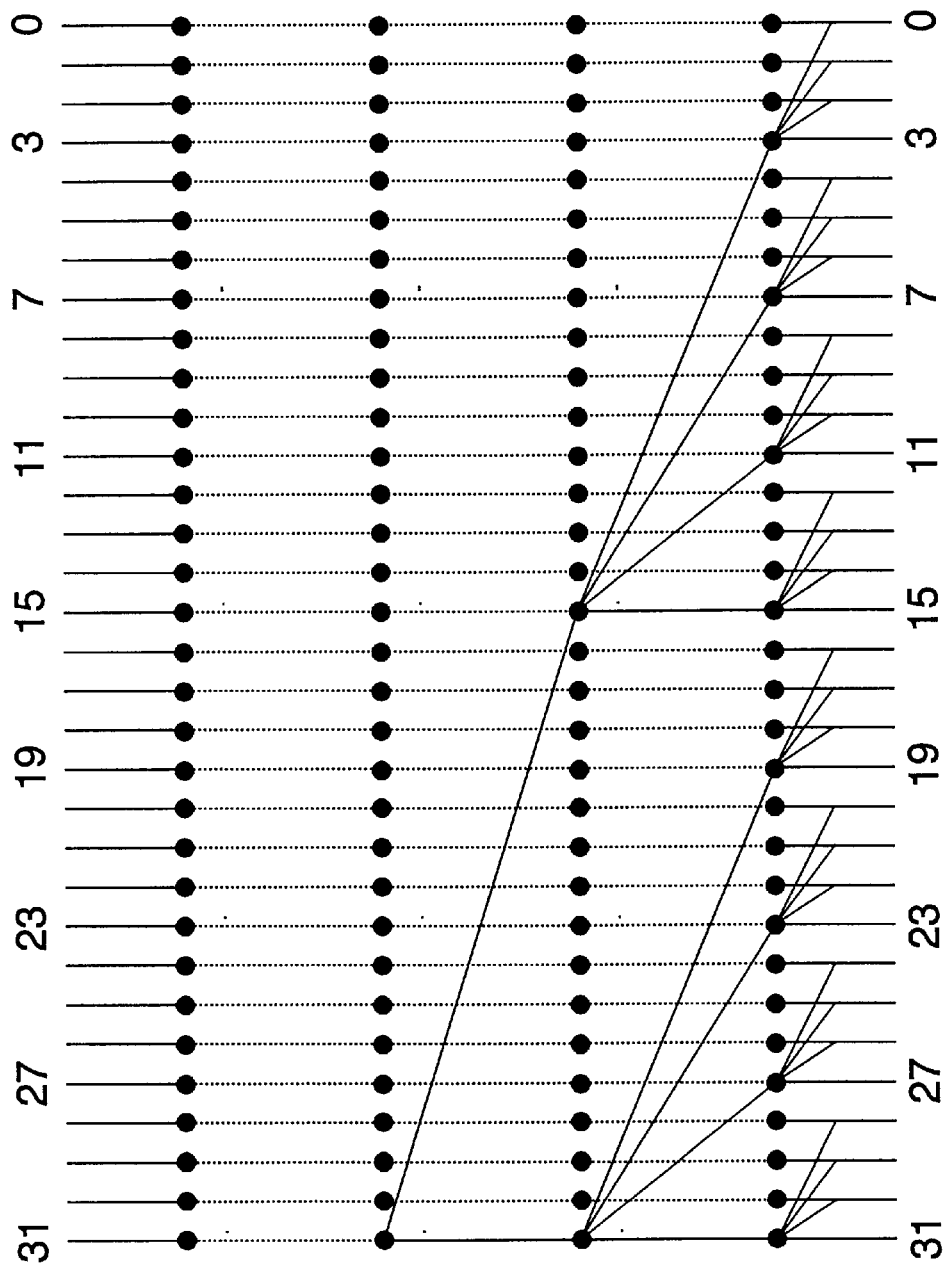
FIG. 7 illustrates the interconnections between four-input-pair carry evaluation circuits being used to calculate the most significant bit of a 32 bit carry binary number.

FIG. 7 shows a part of a 32-bit adder design that generates the carry for the 32nd bit. 4-input-pair carry arbiters are used in the first and second rows (from the bottom), whereas 2-input-pair arbiters are employed in the third row. The carry computation goes through only three logic layers.

Figure 8:
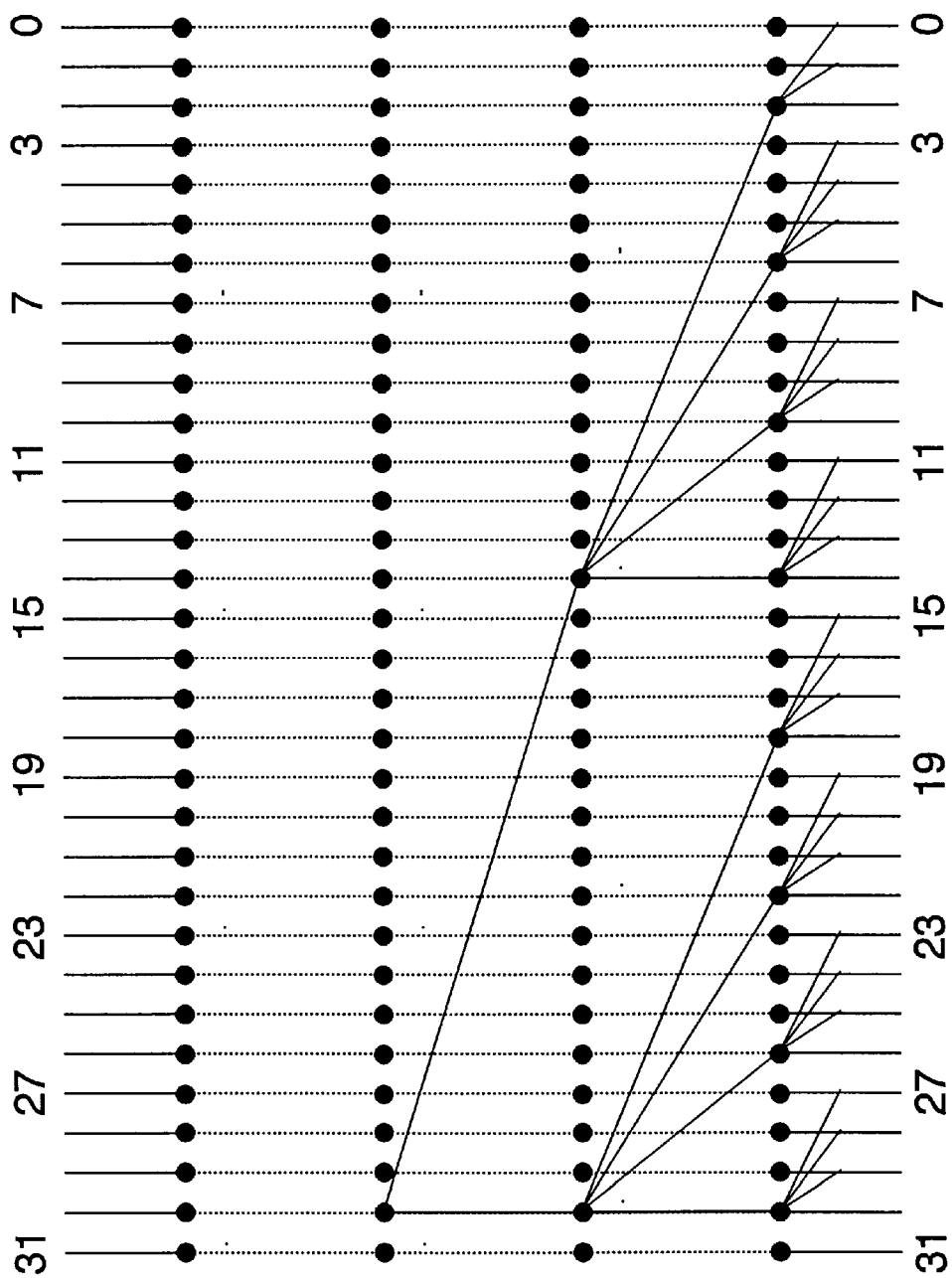
FIG. 8 corresponds to FIG. 7 except that the second most significant bit is being evaluated.

FIG. 8 shows the part of the circuit that generates the 31st bit carry. Analogous circuit (interconnections) to those shown in FIGS. 7 and 8 are used for the other bits of the carry result. Once a carry bit has been determined (i.e. the carry-in and structure result a generate or a kill, with propagate not being possible at that point), then a single signal wire may be used to pass that result to higher levels.

The final row is a sum circuit that operates to XOR the input operands and the carry result.

The carry out from the adder of FIGS. 7 and 8 can be achieved by expanding the three rows of carry arbiters to include a bit 32 and then puts a two bit arbiter in position 32 in the fourth row with inputs from positions 0 and 32 of the previous row. Alternatively, the circuit at position 31 in the fourth row (of adder circuits) into a full adder generating both sum and carry outputs rather than just the sum output of the XOR circuits.

In a typical embodiment the present scheme takes only 1.85 ns to complete a 32-bit carry computation using a 0.6 $\mu$m CMOS process technology.

As soon as $v_i$ and $w_i$ are equal (meaning that the carry has been generated), only single-rail signals need to be routed instead of dual-rail signals. This results in a significant reduction of chip area, especially in the third row where more room is needed to accommodate signals crossing from the least significant bits to the most significant bits. Thus, the resulting adder is quite compact.

As an example of the use of the above technique, the design of an 80-bit high-speed adder with a moderate chip area will now be considered.

The carry $c_i$ is evaluated by adding two 1-bit numbers $a_i$ and $b_i$ as shown in Table 1 above. There are two general cases defined by the values $a_i$ and $b_i$. The first case, where there is a carry request, arises when both operand bits are equal. A 1-carry request occurs if both inputs are 1, whereas a 0-carry request if both inputs are 0. The second case, where there is no carry request, arises when the operand bits have different values. The letter u indicates there is no carry request.

Figure 9:
FIG. 9 illustrates a 4-input pair carry evaluation circuit.

We introduce the concept of carry arbitration by taking a four-way carry arbiter as shown in FIG. 9 as an example. Any input pair $a_i$ and $b_i$ ($0 \leq i \leq 3$) can make a carry request and hence two or more carry requests may occur at the same time. Therefore, it is necessary to arbitrate these carry requests. The input pair ($a_3$, $b_3$) can make a non-maskable carry request, where non-maskable means that a carry request from the input pair ($a_3$, $b_3$) must always be acknowledged by the output c. The other three input pairs ($a_2$, $b_2$), ($a_1$, $b_1$) and ($a_0$, $b_0$) can make maskable carry requests, where maskable means that carry requests from these three input pairs may be masked by the input pair ($a_3$, $b_3$). The input pair ($a_2$, $b_2$) has higher priority than the input pairs ($a_1$, $b_1$) and ($a_0$, $b_0$). The input pair ($a_0$, $b_0$) has the lowest priority.

Only when there is no non-maskable carry request from the input pair ($a_3$, b3) is a maskable carry request from the input pair ($a_2$, $b_2$) acknowledged by the output c. Only when there is no non-maskable carry request from the input pair ($a_3$, $b_3$) and no maskable carry request from the input pair ($a_2$, $b_2$) is a maskable carry request from the input pair ($a_1$, $b_1$) acknowledged by the output c. Only when there are no carry requests from the input pairs ($a_3$, b3), ($a_2$, $b_2$) and ($a_1$, $b_1$) is a carry request from the input pair ($a_0$, $b_0$) acknowledged by the output c. Table 7 outlines the truth table required to implement four-way carry arbiters.

TABLE 7

| $a_3,b_3$ | $a_2,b_2$ | $a_1,b_1$ | $a_0,b_0$ | c |
|---|---|---|---|---|
| 00 | — | — | — | 0 |
| 11 | — | — | — | 1 |
| 01 or 10 | 00 | — | — | 0 |
| 01 or 10 | 11 | — | — | 1 |
| 01 or 10 | 01 or 10 | 00 | — | 0 |
| 01 or 10 | 01 or 10 | 11 | — | 1 |
| 01 or 10 | 01 or 10 | 01 or 10 | 00 | 0 |
| 01 or 10 | 01 or 10 | 01 or 10 | 11 | 1 |
| 01 or 10 | 01 or 10 | 01 or 10 | 01 or 10 | u |

Figure 10:
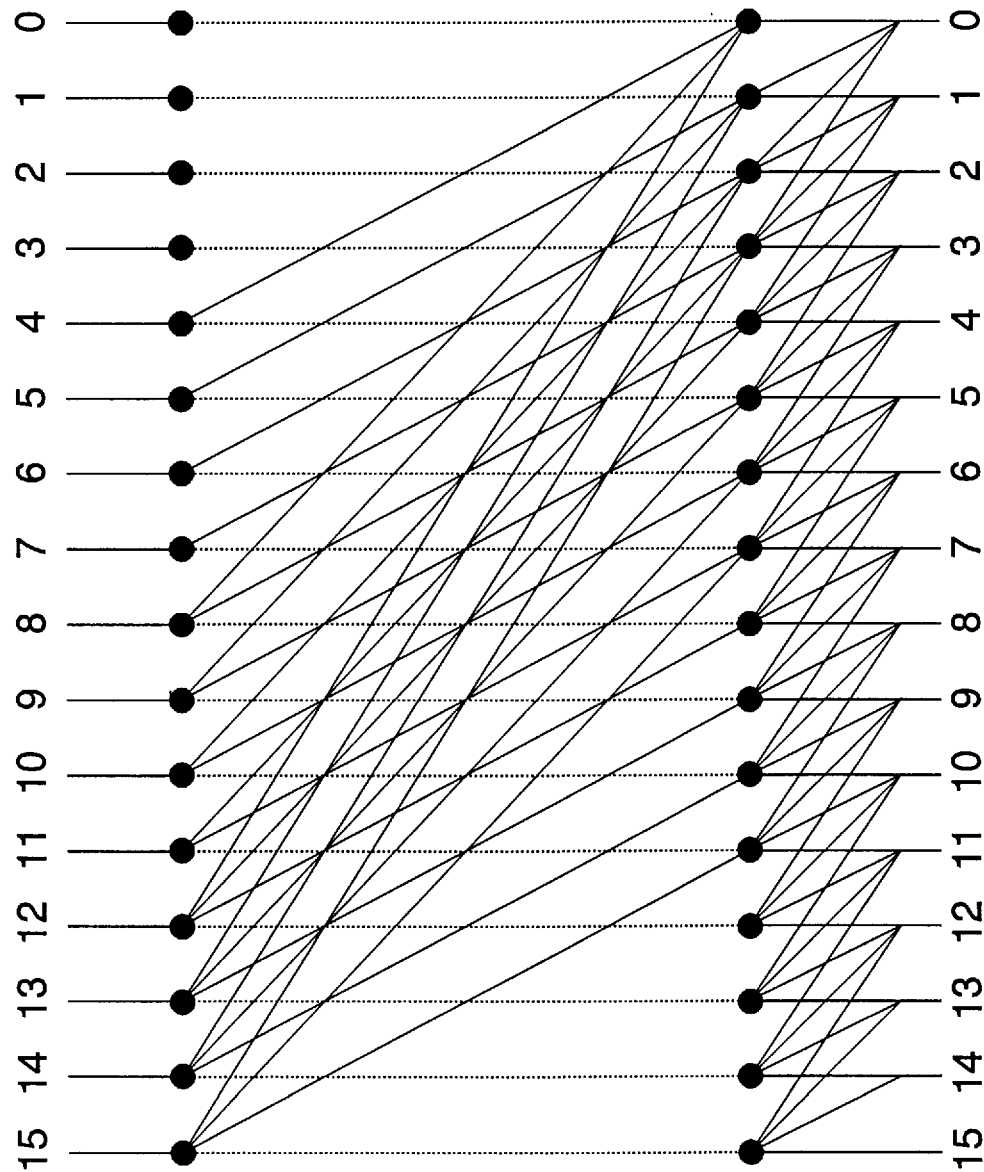
FIG. 10 illustrates a 16-bit adder using 4-input pair carry evaluation circuits.

Using the same approach, carry arbiters with any number of ways can be derived. The carries can be generated quickly by using carry arbiters combined into a tree structure which exploits the associativity of the carry computation. FIG. 10, for example, illustrates 16-bit carry computation base on the carry arbitration. The solid dots represents carry arbiters. The addition of n-bit numbers using m-way carry arbiters can be performed in a time proportional to $O(\log_m n)$.

Theoretically, the more inputs each carry arbiter handles, the faster the carries are generated. However, carry arbiters with more than four ways are not usually of practical interest. Firstly, too many series transistors are needed to implement these arbiters, which leads to inefficient CMOS designs. Secondly, the arbiter cell layout can easily become too large for the bit pitch of a datapath. Four-way carry arbiters and their dynamic CMOS implementation are chosen because they give the good results in this 80-bit design. Other designs, such as 32-bit adders, favor three-way carry arbiters.

Motivated by the dual-rail data encoding used in self-timed design, the carry request out c can be encoded using two wires (aa, bb) as shown in Table 8. Equations 6 and 7 give the behavior defined by Tables 7 and 8.

TABLE 8

$$aa = a_3b_3 + (a_3 + b_3)(a_2b_2 + (a_2 + b_2)(a_1b_1 + (a_1 + b_1)a_0)) \quad (6)$$
$$bb = a_3b_3 + (a_3 + b_3)(a_2b_2 + (a_2 + b_2)(a_1b_1 + (a_1 + b_1)b_0)) \quad (7)$$

| c | aa,bb |
|---|---|
| 0 | 0 0 |
| 1 | 1 1 |
| u | 0 1 |
| u | 1 0 |

Figure 11:
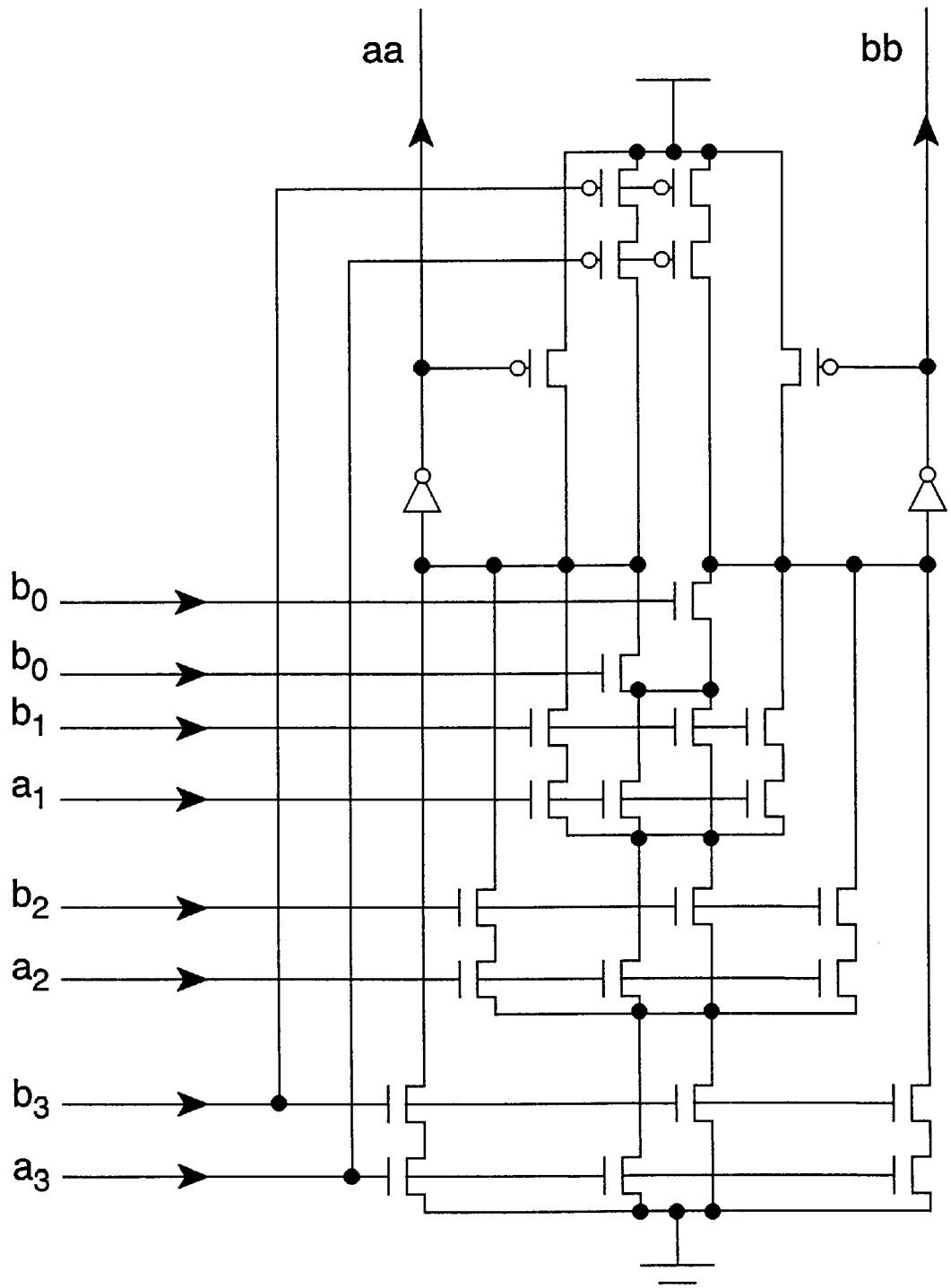
FIGS. 11 and 12 illustrate CMOS circuit implementations of 4-input pair carry evaluating circuits.

FIG. 11 shows a direct dynamic CMOS implementation of the four-way carry arbiter according to the above equations. The operation of the circuit is such that the nodes n1 and n2 are precharged high when the inputs $a_3$ and $b_3$ are low during the reset phase of the control handshake and will conditionally discharge during the evaluation phase. The buffers are used to maintain drive strength.

Figure 12:
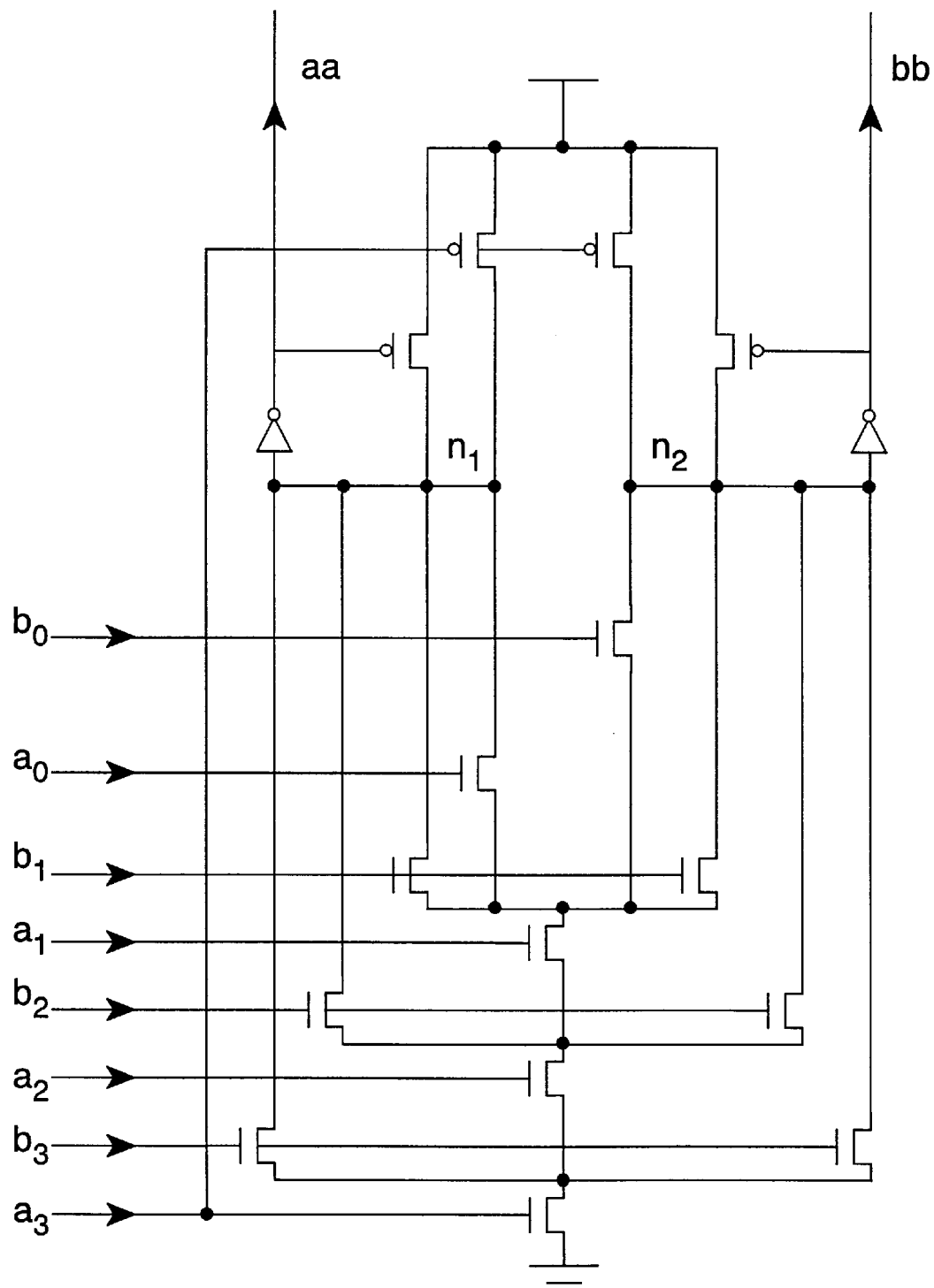

FIG. 12 gives a modified version of the four-way carry arbiter. We assume here that every input pair $(a_i, b_i)$ takes one of the three values (0 0), (1 1) and (1 0), and (0 1) has already been transformed to (1 0). The reasons are twofold. Firstly, it is easy to layout the modified circuit into the bit pitch (21.5 μm in this embodiment) of a datapath and it is about 300 ps faster than the direct implementation. Secondly and more importantly, the outputs aa and bb have new meaning. If the outputs aa and bb have different values, this means there are no carry requests from the inputs as described previously. However, we can take another view of a four-way carry arbiter. If we consider a four-way carry arbiter as a carry generation circuit for a 4-bit addition, then one of the outputs aa and bb can be viewed as the carry out generated with a zero carry-in and the other is with a one carry-in. The direct implementation does not distinguish which is the carry out generated with a zero carry-in and which with a one carry-in. The modified circuit gives exactly the outputs aa as the carry out generated with a one carry-in and the output bb as the carry out generated with a zero carry-in. This results in a significant reduction of chip area (see below) and is an important feature of this embodiment.

However, the use of the modified implementation needs the input conversion from (0 1) to (1 0). Fortunately this causes no problem; the conversion is simple. It consists of one 2-input NAND and one 2-input NOR gate per bit. For practical reasons, gates are normally necessary anyway to isolate the signals from the main input bases. The difference here is that NAND and NOR gates are used instead of inverters. If two input buses are designed using a precharge structure, the outputs after NAND and NOR gates are naturally low (required in the dynamic implementation) when the buses are precharged high. Furthermore, these NAND and NOR gates can be reused for logic operations in an ALU design.

Figure 13:
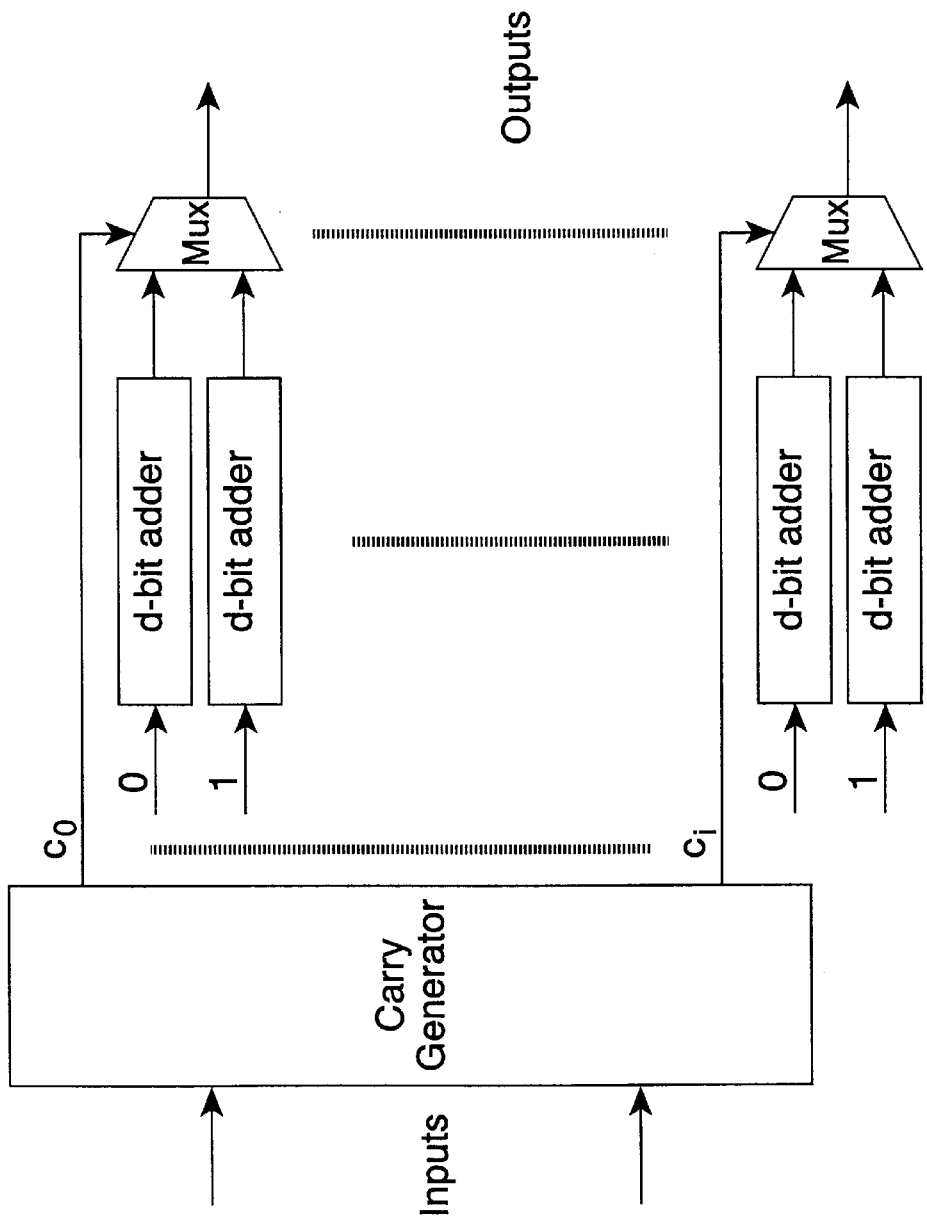
FIG. 13 illustrates a conventional adder circuit.

Consider first a conventional approach to high speed adder design. FIG. 13 shows a conventional adder design using the carry select scheme. The inputs are divided into d-bit groups. Two adders are needed per group. One is an adder with a zero carry-in and the other with a one carry-in. The carry generator is responsible for generating the boundary carries for all groups, which are then used to select the appropriate sum using a multiplexer. A design decision must be made to chose appropriate groups in order to balance the delays of both the carry generator and the group adders. If the group adders are made too long, then the decreasing delays in the carry generator are exceeded by the increasing delays of the group adders. If the group adders are made too short, the logic depth of the carry generator increases and its delay determines the total adder delay.

Figure 14:
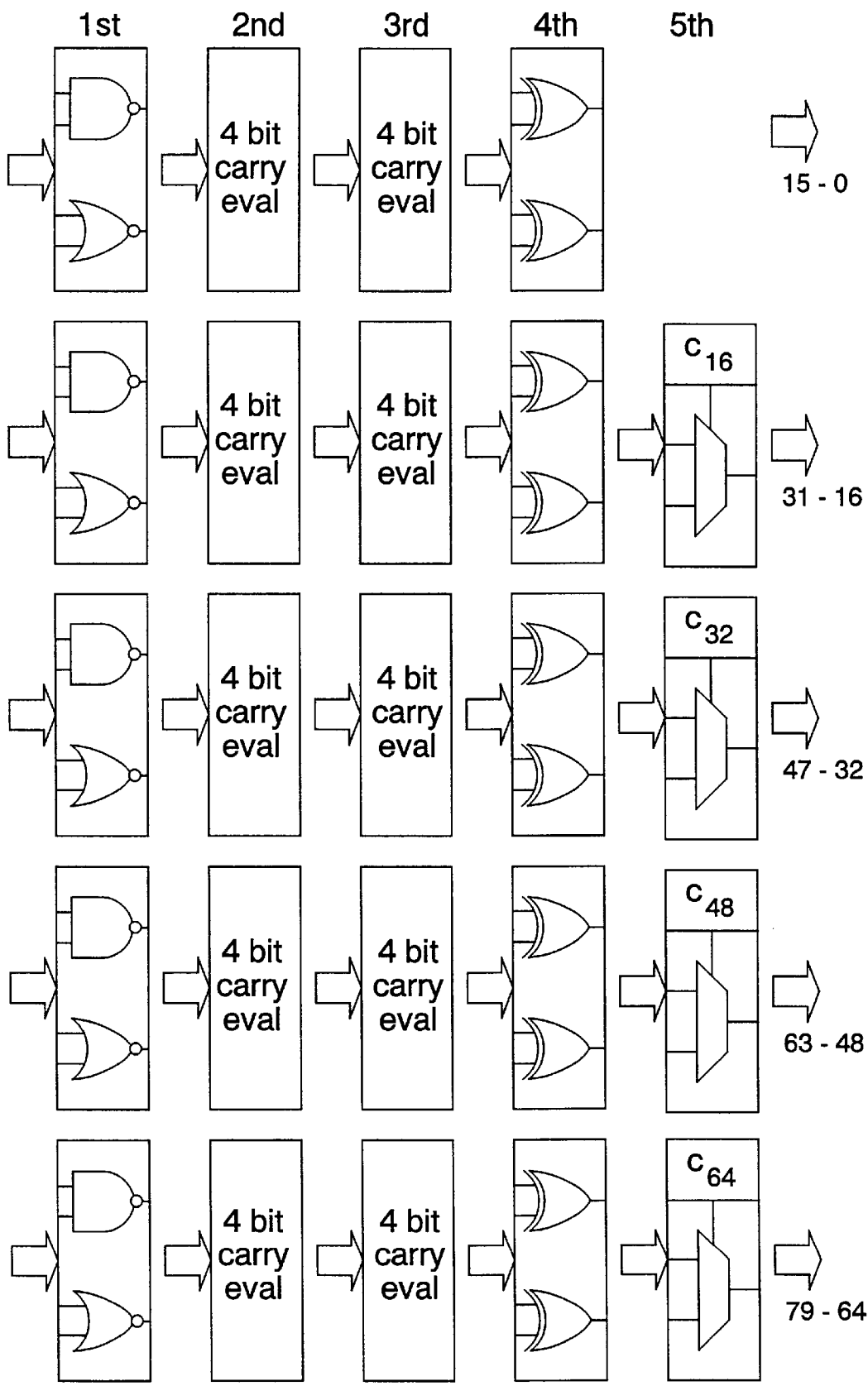
FIG. 14 illustrates an adder circuit incorporating 4-input pair carry evaluating circuits.

A block diagram of an 80-bit adder in accordance with one embodiment of the present invention is shown in FIG. 14. The whole adder is visualized (but not divided) as consisting of five 16-bit groups. The first row is the conversion circuit, which contains 2-input NAND and NOR gates. The second and third rows are the four-way arbiters which produce the carries within each group and have the form discussed previously. The fourth row produces two intermediate sums with a zero carry-in and a one carry-in. The final row is multiplexers which select the final sum result and three carry arbiters which generate the boundary carries $c_{16}$, $c_{32}$, $c_{48}$ and $c_{64}$. The carries of the 16 least significant bits have already been generated after two rows of the carry computation. It is clear that, compared with the conventional carry-select scheme, the need for group adders has been eliminated. The two intermediate sums are elegantly generated within the carry generation tree. This results in a significant reduction of chip area, especially when the groups are made to be long, since group adders also need some mechanisms for carry computation. In a sense, the conventional approach results in too much redundancy. It is worth noting that only single-rail signals need to be routed (instead of dual-rail signals) if the signals aa and bb are known to be equal (meaning that the carry has been generated, as either a 1-carry or a 0-carry request).

The adder is designed in a 0.5 μm triple metal CMOS technology. The layout has a regular structure and uniform fan-in and fan-out loadings and hence is very compact. Post-layout HSPICE simulation shows that the adder takes 3.5 ns to complete an 80-bit addition. The characteristics of this adder are summarized in Table 9.

TABLE 9

| Technology | 0.5 μm triple metal CMOS |
|---|---|
| Power Supply | 3.3 Volt |
| Addition Time | 3.5 ns |
| Active Area | 1720 μm × 124 μm |
| Transistor Count | 2546 |
| Transistor Density | 12 k/mm² |

A carry arbitration scheme has been developed in which the carry is generated using a prioritized arbitration of several carry requests based on the associativity of the carry computation. The proposed scheme not only leads to high speed adders due to the few layers of logic required, but also offers a regular and compact layout and uniform fan-in and fan-out loadings.

A dynamic CMOS implementation of a four-way carry arbiter has been devised and modified. The modified version uses double meanings. If the outputs aa and bb are equal, it means that the carry has been generated. If they are different, it means that the output aa is the carry out generated with a one carry-in and the output bb with a zero carry-in.

An asynchronous 80-bit adder design has been described based on the proposed scheme, which takes 3.5 ns to evaluate 80-bit sums in a 0.5 μm triple metal CMOS technology. The active area is 1720 μm×124 μm. An important feature of the adder is that two intermediate sums are elegantly generated within the carry generation tree.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. an adder circuit for adding a first binary number and a second binary number, said adder circuit comprising:

a carry evaluating circuit for evaluating a carry production control signal representing a sum of a block of corresponding bits of said first binary number and said second binary number and an input carry value to said block, said carry production control signal comprising two binary signals V and W that can each have a value of either P or Q, said carry production control signal encoding a carry result from said sum in accordance with:

V=W=P represents a carry kill whereby said carry result is zero independent of said input carry value;

V≠W represents a carry propagate whereby said carry result equals said input carry value; and V=W=Q represents a carry generate whereby said carry result is one independent of said input carry value.

2. An adder circuit as claimed in claim 1, wherein P=0 and Q=1.

3. An adder circuit as claimed in claim 1, wherein said carry evaluating circuit is responsive to two pairs of input signals $(a_1, b_1)$ and $(a_2, b_2)$ that comprise one of two respective pairs of bits of said first binary number and said second binary number and two previously evaluated carry production control signals and V and W are given by:

$$V=a_2.b_2+(a_2+b_2).a_1;$$

and $$W=a_2.b_2+(a_2+b_2).b_1.$$

4. An adder circuit as claimed in claim 1, wherein said carry evaluating circuit is responsive to three pairs of input signals $(a_1, b_1)$, $(a_2, b_2)$ and $(a_3, b_3)$ that comprise one of three respective pairs of bits of said first binary number and said second binary number and three previously evaluated carry production control signals and V and W are given by:

$$V=a_3.b_3+(a_3+b_3)(a_2.b_2+(a_2+b_2).a_1);$$

and $$W=a_3.b_3+(a_3+b_3)(a_2.b_2+(a_2+b_2).b_1).$$

5. An adder circuit as claimed in claim 1, wherein said carry evaluating circuit is responsive to four pairs of input signals $(a_1, b_1)$, $(a_2, b_2)$, $(a_3, b_3)$ and $(a_4, b_4)$ that comprise one of four respective pairs of bits of said first binary number and said second binary number and four previously evaluated carry production control signals and V and W are given by:

$$V=a_4.b_4+(a_4+b_4)(a_3.b_3+(a_3+b_3)(a_2.b_2+(a_2+b_2).a_1));$$

and $$W=a_4.b_4+(a_4+b_4)(a_3.b_3+(a_3+b_3)(a_2.b_2+(a_2+b_2)._1)).$$

6. An adder circuit as claimed in claim 1, wherein said carry evaluating circuit is responsive to N pairs of input signals $(a_1, b_1)$, $(a_2, b_2)$, ..., $(a_N, b_N)$ that comprise one of N respective pairs of bits of said first binary number and said second binary number and N previously evaluated carry production control signals and V and W are given in accordance with the relationships:

$$V=f^N_V(a_N, b_N, \ldots, a_1, b_1);$$

and $$W=f^N_W(a_N, b_N, \ldots, a_1, b_1);$$

where $f^1_V = a_1$;

$f^1_W = b_1$;

and for i ranging between 2 and N;

$$f^i_V(a_i, b_i, \ldots, a_1, b_1) = a_i.b_i + (a_i+b_i).f^{i-1}_V;$$

and $$f^i_W(a_i, b_i, \ldots, a_1, b_1) = a_i.b_i + (a_i+b_i).f^{i-1}_W.$$

7. An adder circuit as claimed in claim 1, wherein a plurality of said carry evaluating circuits are used in a parallel prefix structure to evaluate a full set of carry bits from said first binary number and said second binary number.

8. An adder as claimed in claim 1, wherein said carry evaluating circuit is formed of a plurality of static CMOS logic gates.

9. An adder as claimed in claim 1, wherein said carry evaluating circuit is formed of a plurality of dynamic CMOS logic gates.

10. An adder circuit as claimed in claim 1, comprising:

a carry binary number determining circuit responsive to said first binary number and said second binary number for determining a carry binary number composed of carry bits of a sum of said first binary number and said second binary number, said carry binary number determining circuit having a plurality of circuit stages operating in series to determine said carry binary number, each circuit stage serving to partially resolve said carry binary number and at least one circuit stage including at least one of said carry bit evaluating circuits generating a carry control production signal that is passed between said circuit stages as an input signal to a next circuit stage; and a combinatorial logic circuit responsive to respective corresponding bits of said first binary number, said second binary number and said carry binary number to generate a corresponding bit of a result binary number.

11. An adder circuit as claimed in claim 10, wherein for corresponding bits A, B and C of said first binary number, said second binary number and said carry binary number respectively, said combinatorial logic circuit performs the operation ((A XOR B) XOR C).

12. An adder circuit as claimed in claim 1, wherein for carry evaluating circuits for which said carry control production signal must represent either a carry kill or a carry generate, V=W and a single signal line may be used to transmit said carry control production signal.

13. An adder circuit as claimed in claim 1, wherein said carry evaluating circuit has a carry in input and generates a carry out output such that when V≠W, then V equals the carry out output with 1 as the carry in input and W equals the carry out output with 0 as the carry in input.

14. An adder circuit as claimed in claim 13, wherein said carry evaluating circuit combines with a carry-select circuit to generate a final result.

15. An integrated circuit microprocessor incorporating an adder circuit as claimed in claim 1.

16. a method of operating an adder circuit for adding a first binary number and a second binary number, said method comprising the steps of:

evaluating a carry production control signal representing a sum of a block of corresponding bits of said first binary number and said second binary number and an input carry value to said block, said carry production control signal comprising two binary signals V and W that can each have a value of either P or Q, said carry production control signal encoding a carry result from said sum in accordance with:

V=W=P represents a carry kill whereby said carry result is zero independent of said input carry value;

V≠W represents a carry propagate whereby said carry result equals said input carry value; and V=W=Q represents a carry generate whereby said carry result is one independent of said input carry value.

17. An adder circuit for adding a first binary number and a second binary number, said adder circuit including a carry evaluating circuit for evaluating a carry production control signal, said carry production control signal representing a sum of a block of corresponding bits of said first binary number and said second binary number and an input carry value to said block, said carry production control signal comprising two binary signals V and W that can each have a value of either P or Q, said carry production control signal encoding a carry result from said sum in accordance with:

V=W=P represents a carry kill whereby said carry result is zero independent of said input carry value;

V≠W represents a carry propagate whereby said carry result equals said input carry value; and V=W=Q represents a carry generate whereby said carry result is one independent of said input carry value.

* * * * *